Figure 1:
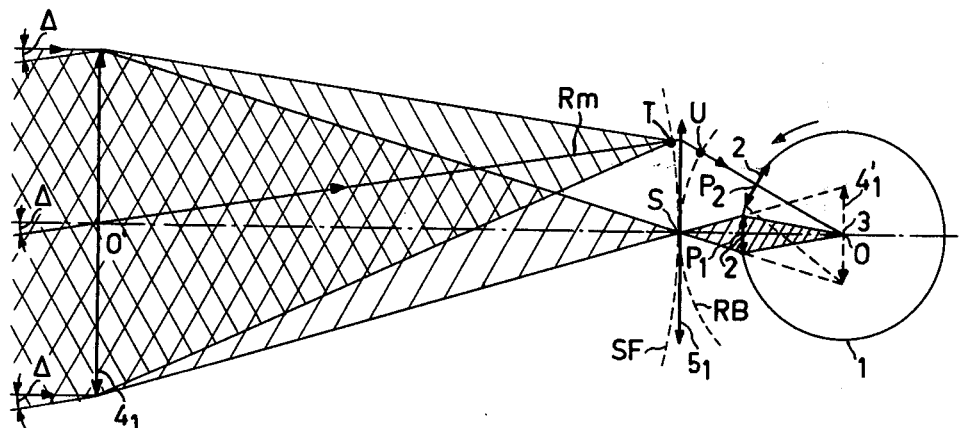

United States Patent
Loy

[11] 3,934,137
[45] Jan. 20, 1976

[54] OPTICAL SCANNING DEVICE
[75] Inventor: Fernand René Loy, Choisy Le Roi, France
[73] Assignee: U.S. Philips Corporation, New York, N.Y.
[22] Filed: Aug. 5, 1974
[21] Appl. No.: 494,392

[30] Foreign Application Priority Data
Aug. 7, 1973   France .............................. 73.28824

[52] U.S. Cl. ................. 250/236; 178/7.6; 250/347; 350/6
[51] Int. Cl.² .... G02B 27/17; H04N 3/06; 250/234, 250/236, 233, 318, 347, 351
[58] Field of Search ...................... 350/6, 7; 178/7.6

[56] References Cited
UNITED STATES PATENTS
| | | | |
|---|---|---|---|
| 2,966,591 | 12/1960 | McCartney ......................... | 350/6 X |
| 3,508,068 | 4/1970 | Harris et al. ........................ | 250/236 |
| 3,588,517 | 6/1971 | Maxwell et al. .................... | 250/233 |
| 3,602,571 | 8/1971 | Norris, Jr. ............................... | 350/7 |
| 3,634,696 | 1/1972 | Wildhabet....................... | 250/236 X |

*Primary Examiner*—James W. Lawrence
*Assistant Examiner*—E. R. LaRoche
*Attorney, Agent, or Firm*—Frank R. Trifari; Simon L. Cohen

[57]               ABSTRACT

In an optical scanning device in which radiation beams from different zones of a field of view are consecutively converged onto a radiation sensitive detector, an optical projection system is included in the radiation path between an objective and an optical cylinder which is provided with optical convergence systems at its circumference. Said projection system conjugates the center of the objective and the center of rotation of the cylinder.

4 Claims, 4 Drawing Figures

OPTICAL SCANNING DEVICE

The invention relates to an optical scanning device in which radiation beams originating from different zones of a field of view consecutive converge onto a radiation-sensitive detector, which device in this order comprises an objective and a rotatable optical cylinder, which at its circumference is provided with at least one optical convergence system, the detector being disposed in the center of rotation of the cylinder.

Such a device is especially employed in apparatus for visualizing terrain which is observed with the aid of infra-red radiation. Such an apparatus is described in French Patent Specification No. 7,303,746. Such equipment displays visible images at a rate which is generally required to be as high as possible. This rate mainly depends on the speed of rotation of the cylinder and the number of optical convergence systems disposed at its circumference.

An optical scanning device of the abovementioned type in which the objective consists of a spherical mirror, is described in French Patent Specification No. 1,494,885. The known device exhibits good optical properties over a very wide field of view (up to approx. 180°).

However, the known device performs less satisfactorily when objects which are located very deep in the field of view are to be observed at a small angle.

In that case it is important to gather a maximum amount of radiation, which is emitted by the remote objects, which means that the objective of the scanning device must have a maxiumum useful aperture.

In the known device the entrance pupil is smaller than the area of the objective, i.e. that a given instant not the entire area of the objective is used.

If the entrance pupil is to be enlarged in spite of this, a choice can be made between the two solutions only:

The first solution is to enlarge the numerical aperture of the optical convergence system. However, in that case it is difficult to design the optical convergence system because of problems caused by optical aberration. On the other hand, it is then no longer possible to dispose a multitude of said optical convergence systems at the circumference of the cylinder. Consequently, to obtain a high scanning rate of the entire field of view, the optical cylinder must be driven with a higher speed.

The second solution is to proportionally enlarge all dimensions of the device. A drawback of this solution is that the device may not only become too bulky, but especially that the moment of inertia of the optical cylinder becomes too great to be driven at high speed.

It is an object of the invention to provide an optical scanning device whose field of view is of the order of some degrees, whose resolving power can reach values which are practically diffraction limited, and in which the diameter of the entrance pupil is independent of the properties of the optical convergence system.

The scanning device according to the invention is characterized in that in the radiation path from the objective to the cylinder is included an optical projection system which directs a radiation beam which passes through the objective at the detector.

For the conception of said cylinder in the device according to the invention it is then possible to choose the best compromise between the number of convergence systems disposed at the circumference of the cylinder and the moment of inertia thereof, so that the rate at which the images are displayed by the apparatus is as high as possible, regardless of the desired aperture of the objective.

Furthermore, arbitrary objectives may be used (lenses, spherical mirrors, parabolic mirrors, etc.).

Figure 2:
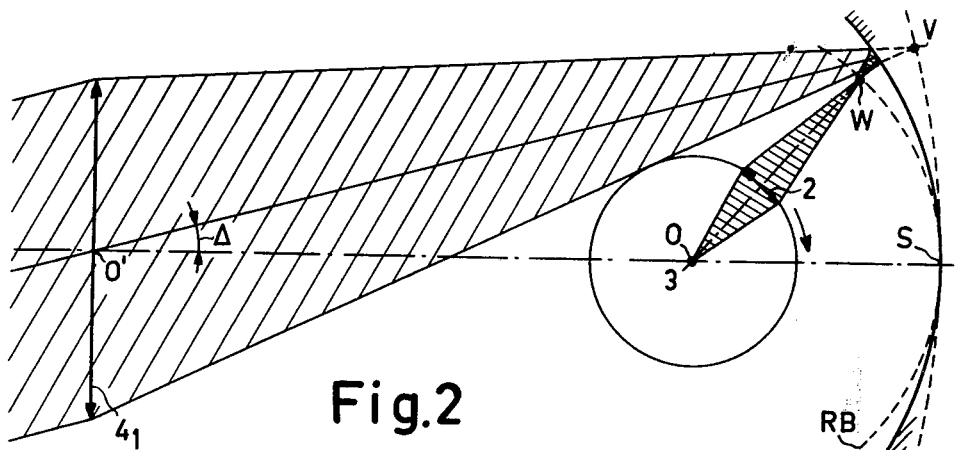
Figure 3:
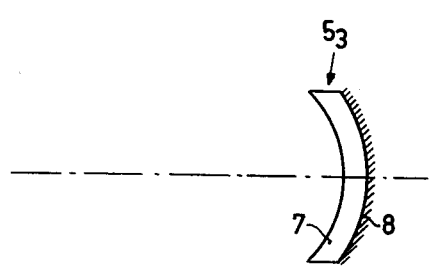
Figure 4:
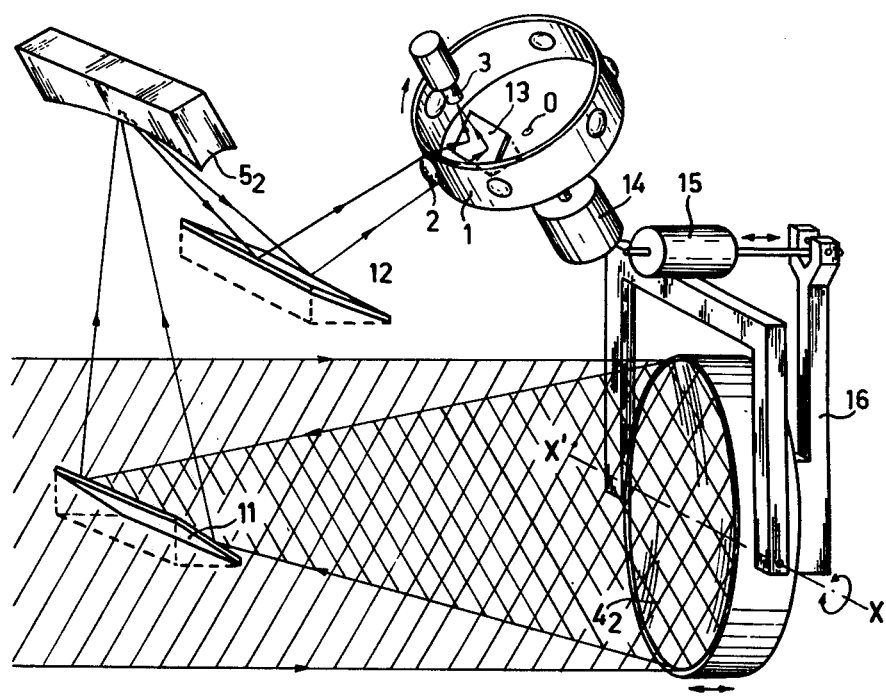

The invention will be described with reference to the accompanying drawings, in which:

FIG. 1 shows a first embodiment of an optical scanning device according to the invention, FIG. 2 shows a second embodiment of an optical scanning device according to the invention, FIG. 3 shows an embodiment of an optical projection system, and FIG. 4 shows an optical scanning device provided with a mechanism for scanning in a second direction.

In the device of FIG. 1 the optical cylinder 1 rotates in the direction of the arrow. At the circumference of the cylinder convergence systems 2 are disposed, only one system being shown for simplicity. In said embodiment the optical convergence system consists of a lens, which is shown in two positions P1 and P2 of the cylinder 1.

By rotating the cylinder the field can be scanned in one direction.

A radiation sensitive detector 3, which provides an indication of the radiation intensity which is incident upon it, is considered to be point-shaped and coincides with the center of rotations 0 of the cylinder 1. The lens 4 is an objective which intercepts the radiation from the field of view. The optical center of said objective is denoted by the reference numeral 0'.

The incident central beam, whose edges are parallel to the optical axis' 00' converges in the point S. This beam subsequently illuminates one of the lens elements 2, which is then in position P1. The lens element 2 converges the beam on the detector 3.

In FIG. 1 the dotted line SF represents the focal plane of the objective $4_1$. The curve RB represents the locus of the images of the detector 3 formed by the lens elements 2 during rotation of the cylinder 1.

According to the invention the radiation path between the objective $4_1$ and the cylinder 1 includes an optical projection system. This projection system directs the beams which are limited by virtually the full aperture of the objective and which come from different field zones at the detector 3.

In the embodiment of FIG. 1 the optical projection system consists of a field lens $5_1$ which is disposed near the focal plane SF of the objective $4_1$, which focal plane is tangent to the curve RB in S. The focal length of the lens $5_1$ is such that the centre 0' of the objective and the center of rotation 0 of the cylinder 1 are conjugated by said lens.

The device according to the invention operates as follows. A beam which comes from one of the scanned field zones and which makes an angle Δ with the axis 00' converges in point T which is located on the focal plane SF.

For clarity, the value of the angle Δ is shown exaggerated and furthermore from point T only the path of the center ray Rm which passes through point 0' is shown.

The ray Rm is directed to the center 0 by the lens $5_1$ so that points 0 and 0' are conjugated by said lens. The beam to which the ray belongs is converged in point 0 by the lens 2.

The sharp field of view of the present device is determined by the optical path between the point T and the point U, the latter point being determined by the intersection of the center ray Rm with the curve RB. If said optical path is too great, the beam coming from the lens 2 is badly converged on the element 3. The distance T-U increases as the angle Δ increases. The field of view of the device of FIG. 1 suffices for certain applications.

Although in FIG. 1 the curves SF and RB are represented as tangent in S, it is of importance in practice that the curves intersect each other, so as to spread differences in pathlength TU. In said last instance TU becomes zero in the case of incidence at an angle which is half the maximum angle of view.

When designing such a device the requirements with which the cylinder should comply are taken as a starting point. The requirements are determined by the specifications of the apparatus of which the device forms part. For example, to display visible images at a high rate by means of said apparatus, it is necessary to arrange a multiplicity of lenses over the circumference of the cylinder in such a way that the speed of rotation does not become too high and without thereby increasing the moment of inertia.

After designing the cylinder the aperture of each lens 2 is then known (which aperture is determined by the diameter $d$ of the pupil) and the distance $f$ between the curve RB and the lens 2.

If the entrance pupil of the objective $4_1$, which determines the aperture thereof, should have a diameter D, an objective is to be chosen whose focal length F will be:

$$F = f(D/d)$$

The lens $5_1$ will image the objective $4_1$ in 0; the image is denoted by $4'_1$ in FIG. 1.

Although the entire beam which is limited by the objective converges in point 0, the said beam is not stopped down by the aperture of the lens 2.

FIG. 2 shows a second embodiment of a device according to the invention, which provides a more extensive field of view. In FIG. 2 corresponding elements have the same reference numerals as in FIG. 1. In the device of FIG. 2 the optical projection system consists of a spherical field mirror $5_2$. In point S the reflecting face of the mirror is tangent both to the curve RB and the curve SF.

An incident beam with parallel edges which makes an angle Δ with the axis 00' and which falls onto the lens $4_1$, converges in point V of the focal plane SF. The mirror $5_2$ forms an image W of V, which image is located closer to the surface RB as the angle Δ becomes smaller. The focal length of the field mirror $5_2$ is determined in the same manner as the focal length of the lens $5_1$ in FIG. 1.

The device of FIG. 2 has a wider field of view than that of FIG. 1, because the curves RB and SF in FIG. 2 are better juxtaposed than in FIG. 2. The field of view of the device of FIG. 2 is of the order of some degrees.

The arrangement of FIG. 2 may be modified. For example, the reflecting face of the mirror $5_2$ may be disposed at a substantial distance from S. Furthermore, the curves RB and SF may intersect. In that case the field of view is extended at the expense of the quality of the image in the center of the field.

In FIG. 3 the projection system $5_3$ consists of a refecting mirror 8 which is cemented onto a lens 7 (a so-termed catadioptric mirror). By a suitable choice of the radii of curvature of the surfaces and of the thickness of the mirror, the field of view may be further extended.

FIG. 4 shows a device which enables a field to be scanned in two directions. Corresponding elements have the same reference numerals as in the preceding Figures.

The objective of the device of FIG. 4 consists of a parabolic mirror $4_2$. A beam which is incident on the mirror is reflected to the mirror $5_2$ via a plane reflecting mirror 11. The beam from the field mirror $5_2$ reaches a lens 2 via a second plane mirror 12. The lens 2 converges the beam onto the detector 3 via a third plane mirror 13.

By rotating the cylinder 1 with the aid of a motor 14 rapid scanning is possible in one direction and slow scanning in a second direction by oscillating the parabolic mirror $4_2$ through small angles about an axis XX' through the vertex of the parabola. The oscillation is obtained with the aid of a linear motor 15 and a lever 16 which forms part of the mount of the parabolic mirror $4_2$.

What is claimed is:

1. An optical scanning device in which radiation beams originating from different zones of a field of view are consecutively converged onto a radiation sensitive detector, which device comprises an objective, a rotatable optical cylinder, at least one optical convergence system on the circumference of the cylinder, the detector being disposed in the center of rotation of the cylinder, and an optical projection system means between the objective and the cylinder for directing a radiation beam which passes through the objective towards the detector and for optically conjugating the center of the objective with the center of rotation of said cylinder.

2. A scanning device as claimed in claim 1, wherein the optical projection system means comprises a lens which is disposed near the focal plane of the objective and near the locus of the images of the detector which images are formed by the optical convergence system during rotation of the cylinder, the focal length of the lens being such that the center of the objective and the center of rotation of the cylinder are conjugated by said lens.

3. A scanning device as claimed in claim 1, wherein the optical projection system means comprise a spherical concave mirror, which is disposed near the focal plane of the objective and near the locus of images of the detector, which images are formed by the optical convergence system during rotation of the cylinder, the focal length of the spherical concave mirror being such that the center of the objective and the center of rotation of the cylinder are conjugated by the mirror.

4. A scanning device as claimed in claim 1, wherein the optical projection system means comprises a catadioptric mirror, which is disposed near the focal plane of the objective and the locus of images of the detector, which images are formed by the optical convergence system during rotation of the cylinder.

* * * * *

UNITED STATES PATENT AND TRADEMARK OFFICE
CERTIFICATE OF CORRECTION

PATENT NO. : 3,934,137
DATED : January 20, 1976
INVENTOR(S) : FERNAND RENE LOY

It is certified that error appears in the above-identified patent and that said Letters Patent are hereby corrected as shown below:

IN THE SPECIFICATION

Col. 1, line 5, "consecutive" should be --consecutively--;

line 34, after "that" should be --at--;

Col. 2, line 28, "4" should be --$4_1$--;

Signed and Sealed this fourth Day of May 1976

[SEAL]

Attest:

RUTH C. MASON
*Attesting Officer*

C. MARSHALL DANN
*Commissioner of Patents and Trademarks*